United States Patent
Nakajima et al.

(10) Patent No.: US 11,719,781 B2
(45) Date of Patent: Aug. 8, 2023

(54) LOCATION SYSTEM

(71) Applicant: ALPS ALPINE CO., LTD., Tokyo (JP)

(72) Inventors: Satoshi Nakajima, Miyagi (JP); Satoshi Hayasaka, Miyagi (JP); Yasuhiro Suzuki, Tokyo (JP)

(73) Assignee: ALPS ALPINE CO., LTD., Tokyo (JP)

( * ) Notice: Subject to any disclaimer, the term of this patent is extended or adjusted under 35 U.S.C. 154(b) by 19 days.

(21) Appl. No.: 17/653,709

(22) Filed: Mar. 7, 2022

(65) Prior Publication Data

US 2022/0187412 A1 Jun. 16, 2022

Related U.S. Application Data (63) Continuation of application No. PCT/JP2020/029345, filed on Jul. 30, 2020.

(30) Foreign Application Priority Data

Sep. 19, 2019 (JP) .................................. 2019-170673

(51) Int. Cl.
*G01S 5/00* (2006.01)
*G01S 5/02* (2010.01)
(Continued)

(52) U.S. Cl.
CPC .............. *G01S 5/0268* (2013.01); *G01S 3/48* (2013.01); *H04W 4/029* (2018.02)

(58) Field of Classification Search
CPC ......... G01S 5/0268; G01S 3/48; H04W 4/029
See application file for complete search history.

(56) References Cited

U.S. PATENT DOCUMENTS 6,140,964 A 10/2000 Sugiura et al.
9,826,356 B2 * 11/2017 Mycek ................. H04B 17/318
(Continued)

FOREIGN PATENT DOCUMENTS

CN    112312301 A  *  2/2021  .............. G01S 11/06
JP    H10-094040       4/1998
(Continued)

OTHER PUBLICATIONS

International Search Report for PCT/JP2020/029345 dated Sep. 29, 2020.
(Continued)

*Primary Examiner* — Khai M Nguyen
(74) *Attorney, Agent, or Firm* — Ipusa, PLLC (57) ABSTRACT

The location system includes two measurers apart from each other and configured to measure first and second variables in accordance with times of arrival of radio waves and first reception strengths, respectively; a memory configured to store first data associating a plurality of zones with first and second reference variables corresponding to times of arrivals of radio waves with respect to the two measurers for a case where the radio waves are transmitted from the plurality of zones, and second data associating the plurality of zones with first and second reference reception strengths with respect to the two measurers for the case where the radio waves are transmitted from the plurality of zones; and a processor configured to identify from among the plurality of zones a zone having a highest probability of including a position from where radio waves are transmitted.

9 Claims, 5 Drawing Sheets

(51) Int. Cl.
    *H04W 4/029*     (2018.01)
    *G01S 3/48*     (2006.01)

(56) References Cited

U.S. PATENT DOCUMENTS

| | | | |
|---|---|---|---|
| 11,496,990 B2* | 11/2022 | Edge | H04L 5/005 |
| 11,509,733 B2* | 11/2022 | Gum | H04W 4/70 |
| 2007/0207816 A1 | 9/2007 | Spain, Jr. | |
| 2008/0106375 A1 | 5/2008 | Nakajima et al. | |
| 2010/0309051 A1* | 12/2010 | Moshfeghi | G01S 5/0236 |
| | | | 342/451 |
| 2015/0312719 A1* | 10/2015 | Cho | G01S 1/00 |
| | | | 455/456.1 |
| 2018/0017660 A1* | 1/2018 | Roquel | G01S 5/02585 |
| 2018/0106882 A1 | 4/2018 | Kanaga | |
| 2018/0213355 A1* | 7/2018 | Smith | G01S 13/765 |

FOREIGN PATENT DOCUMENTS

| | | | | |
|---|---|---|---|---|
| JP | 2008-115648 | | 5/2008 | |
| JP | 2012-255673 | | 12/2012 | |
| JP | 2017-015698 | | 1/2017 | |
| JP | 2018-066174 | | 4/2018 | |
| JP | 2018062339 A | * | 4/2018 | B60R 25/24 |

OTHER PUBLICATIONS

Naoaki Yokoi et al., "An Error Offset Method for PHS Positioning System Based on Mahalanobis Distance", The University of Tokyo and The Location Inc., Jul. 4, 2009, with English Abstract.

\* cited by examiner

| MEASURING UNIT | 4,5 | | |
|---|---|---|---|
| SUBZONE | In_Front | ... | Out_Rear |
| $x_1$ | DataIn001 | ... | DataOut001 |
| ⋮ | ⋮ | ⋮ | ⋮ |
| $x_8$ | DataIn008 | ... | DataOut008 |
| $x_9$ | DataIn009 | ... | DataOut009 |
| $x_{10}$ | DataIn010 | ... | DataOut010 |

|  | ACCURACY RATE In (%) | ACCURACY RATE Out (%) | ACCURACY RATE Ave (%) |
|---|---|---|---|
| EMBODIMENT | 94.9 | 73.7 | 84.3 |
| COMPARATIVE EXAMPLE | 70.4 | 88.7 | 79.6 |

LOCATION SYSTEM

CROSS-REFERENCE TO RELATED APPLICATION

The present application is a continuation filed under 35 U.S.C. 111 (a) claiming the benefit under 35 U.S.C. 120 and 365 (c) of PCT International Application No. PCT/JP2020/029345 filed on Jul. 30, 2020, and designating the U.S., which is based on and claims priority to Japanese Patent Application No. 2019-170673, filed on Sep. 19, 2019. The entire contents of the PCT International Application No. PCT/JP2020/029345 and the Japanese Patent Application No. 2019-170673 are incorporated herein by reference.

BACKGROUND OF THE INVENTION

1. Field of the Invention

The present invention relates to a location system.

2. Description of the Related Art

In the related art, when it is detected that a portable device is positioned in a zone where influence of crosstalk is present and/or saturation occurs around a transmitting antenna among transmitting antennas, from strength data from the part of the transmitting antenna detected by a portable device control unit, a vehicle-side control unit determines whether the strength data from the transmitting antenna detected by the portable device is included in a data group including multiple pieces of strength data obtained as a result of the portable device receiving signals transmitted from the transmitting antenna when the portable device is moved along an inner surface of an interface between the inside and the outside of the vehicle in the zone. Then, when it is determined that the strength data from the transmitting antenna detected by the portable device is included in the data group, it is determined that the portable device is positioned inside the vehicle, whereas it is determined that the portable device is positioned outside the vehicle otherwise (see, for example, Patent Document 1).

CITATION LIST

[Patent Document 1] US Publication No .2008/0106375A1

SUMMARY OF THE INVENTION

Technical Problem

Although the vehicle-side control unit in the related art determines the position of the portable device based on the received signal strength data (reception strength), the reception strength may vary depending on how the portable device is held by hand, a battery voltage, multipath, and the like.

Therefore, an object of the present invention is to provide a location system in which locating accuracy can be improved.

Solution to Problem

A location system according to an embodiment of the present invention includes a first measurer configured to measure a first variable in accordance with a time of arrival of a radio wave and measure a first reception strength of the radio wave; a second measurer apart from the first measurer and configured to measure a second variable in accordance with a time of arrival of a radio wave and a second reception strength of the radio wave; a memory configured to store first data that associates a plurality of zones with a first reference variable and a second reference variable corresponding to times of arrivals of radio waves with respect to the first measurer and the second measurer for a case where the radio waves are transmitted from the plurality of zones, and second data that associates the plurality of zones with a first reference reception strength and a second reference reception strength with respect to the first measurer and the second measurer for the case where the radio waves are transmitted from the plurality of zones; and a processor configured to identify from among the plurality of zones a zone that has a highest probability of including a position from where radio waves are transmitted, based on the first variable and second variable, the first reference variable and second reference variable, the first reception strength and second reception strength, and the first reference reception strength and second reference reception strength, using a predetermined identifying method.

Advantageous Effects of the Invention

It is possible to provide a location system in which locating accuracy can be improved.

BRIEF DESCRIPTION OF THE DRAWINGS

Other objects, features and advantages of the present invention will become more apparent from the following detailed description when read in conjunction with the accompanying drawings.

DETAILED DESCRIPTION OF THE PREFERRED EMBODIMENTS

Figure 1:
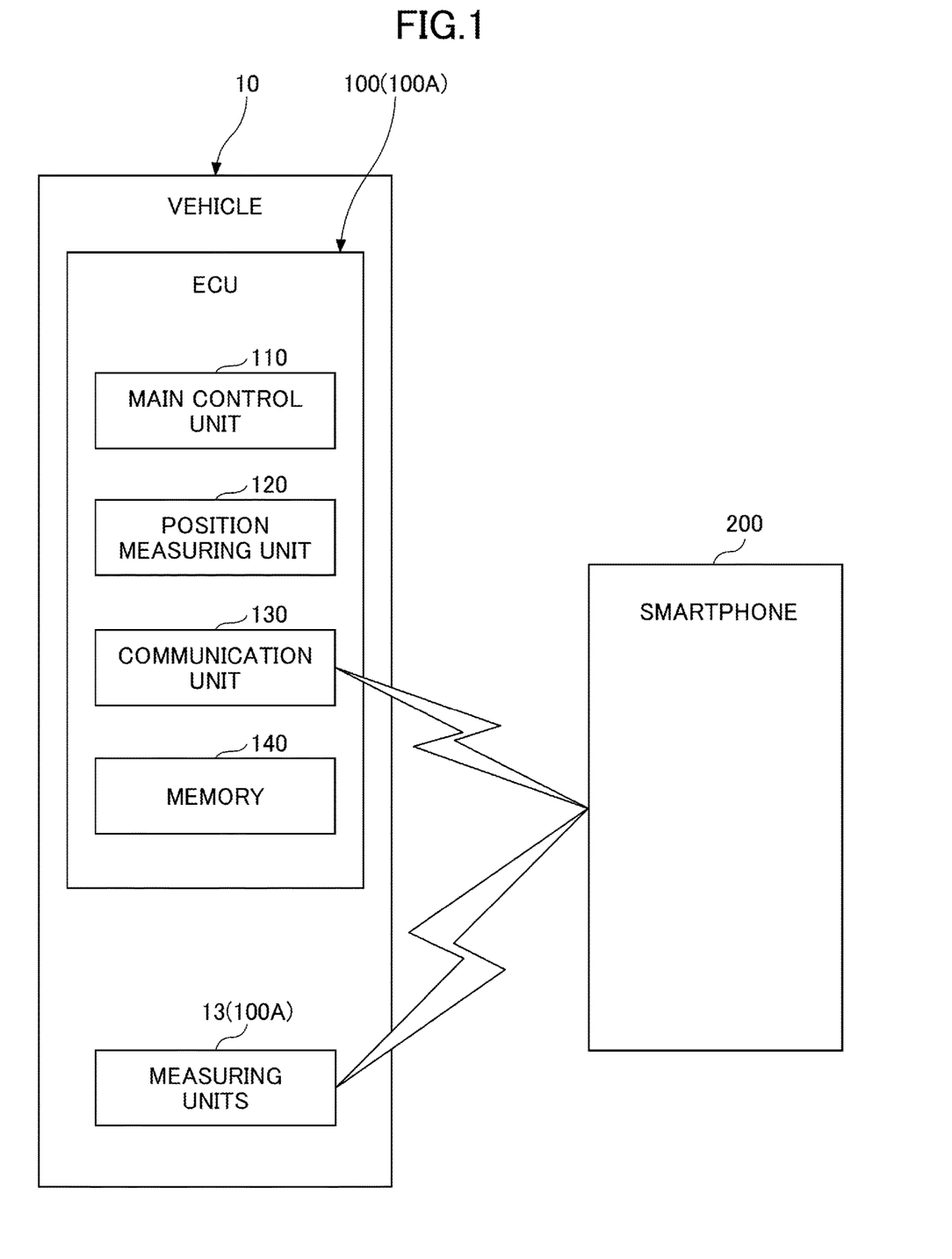
FIG. 1 depicts a vehicle 10 and a smartphone 200.

Hereinafter, an embodiment of a location system according to the present invention will be described.
<Embodiment>
FIG. 1 depicts a vehicle 10 and a smartphone 200. The vehicle 10 includes a position measuring electronic control unit (ECU) 100 and measuring units 13. The position measuring ECU 100 and the measuring units 13 are included in a location system 100A. For this reason, the position measuring ECU 100 and the measuring units 13 are provided with the reference numeral 100A in parentheses.

The vehicle 10 includes, but is not limited to, an automatic parking ECU and another ECU, an ultrasonic sensor, a camera, an acceleration sensor, a speed sensor, and the like, in addition to the position measuring ECU 100 and the measuring units 13.

The position measuring ECU 100 measures a position of the smartphone 200 around the vehicle 10. The smartphone 200 is an example of a terminal for a remote parking system that causes the vehicle 10 to autonomously operate and move into a parking space through radio communication from the outside of the vehicle 10.

The automatic parking ECU is an ECU that causes the vehicle 10 to autonomously operate and move in accordance with instructions sent from the smartphone 200 and parks the vehicle 10 in an empty parking space detected by the camera, the ultrasonic sensor, or the like.

The position measuring ECU 100, the measuring units 13, the automatic parking ECU, the ultrasonic sensor, the camera, the acceleration sensor, the speed sensor, and the smartphone 200 are included in the remote parking system to enable automatic parking of the vehicle 10. The functions required for the remote parking system are implemented by, for example, the position measuring ECU 100, the automatic parking ECU, and the smartphone 200; detailed descriptions will be omitted.

The measuring units 13 receive a beacon signal from the smartphone 200 and measure angles representing directions in which the smartphone 200 is positioned with respect to the measuring units 13. The measuring units 13 include communication units and ECUs. The communication units of the measuring units 13 are, for example, short range radio communication devices of the Bluetooth low energy (BLE) (registered trademark) standard and each of the measuring units 13 includes two antennas (positioning antennas). The communication units of the measuring units 13 are examples of receiving units. However, the measuring units 13 may have functions to transmit data to the smartphone 200.

The ECU of each measuring unit 13 measures the angles representing the directions in which the smartphone 200 is positioned relative to the measuring unit 13 based on a phase difference of the beacon signal received by the two antennas in an angle of arrival (AOA) method. The measuring units 13 measure received signal strength indicators (RSSIs) (received signal strengths) when the beacon signal is received. The measuring units 13 transmit data representing the obtained angles (angle data) and RSSIs to the position measuring ECU 100.

The plurality of measuring units 13 are provided in the vehicle 10. The measuring units 13 are not limited to communication devices of Bluetooth, and may be communication devices of WLAN (Wireless Local Area Network) or another standard.

In the remote parking system, the vehicle 10 can be operated by the smartphone 200 when a distance from the measuring units 13 to the smartphone 200 is within a predetermined distance (for example, 6 m).

The position measuring ECU 100 is implemented by a computer including a central processing unit (CPU), a random access memory (RAM), a read-only memory (ROM), and an internal bus. The position measuring ECU 100 includes a main control unit 110, a position measuring unit 120, a communication unit 130, and a memory 140. The main control unit 110, the position measuring unit 120, and the communication unit 130 correspond to functional blocks of a position measuring program executed by the position measuring ECU 100. The memory 140 is a memory of the position measuring ECU 100 and is depicted as a functional block.

The main control unit 110 is a processing unit that supervises control processing of the position measuring ECU 100 and performs processing other than processing performed by the position measuring unit 120 and the communication unit 130.

The position measuring unit 120 receives the angle data and the RSSIs from the measuring units 13 and obtains a position of the smartphone 200.

The position measuring unit 120 calculates Mahalanobis distances for all subzones around the vehicle 10 based on RSSIs of beacon signals received by two measuring units 13 next to each other and angle data representing angles derived from phase differences with respect to the beacon signals, and determines that the smartphone 200 is in a subzone that has the shortest Mahalanobis distance. Subzones will be described later with reference to FIG. 2. A method for calculating Mahalanobis distances will also be described later.

The communication unit 130 communicates with the smartphone 200 via a public network to communicate information of the vehicle 10, commands to start and end a parking process of the vehicle 10, commands to operate the vehicle 10 in a parking process, command data, and so forth.

The memory 140 is an example of a memory that stores a position measuring program and data necessary for the main control unit 110, the position measuring unit 120, and the communication unit 130 to perform the above-described processing. The data stored in the memory 140 includes data used by the position measuring unit 120 to calculate Mahalanobis distances.

The smartphone 200 is an example of a terminal unit for the remote parking system for causing the vehicle 10 to autonomously move to a parking space by radio communication from outside the vehicle 10. For example, the smartphone 200 communicates with the measuring units 13 in accordance with BLE (trademark) and communicates with the communication unit 130 via a public network. The smartphone 200 outputs a beacon signal in accordance with BLE. The beacon signal is an example of a radio wave, and a position of the smartphone 200 is an example of a position from where radio waves are transmitted.

Figure 2:
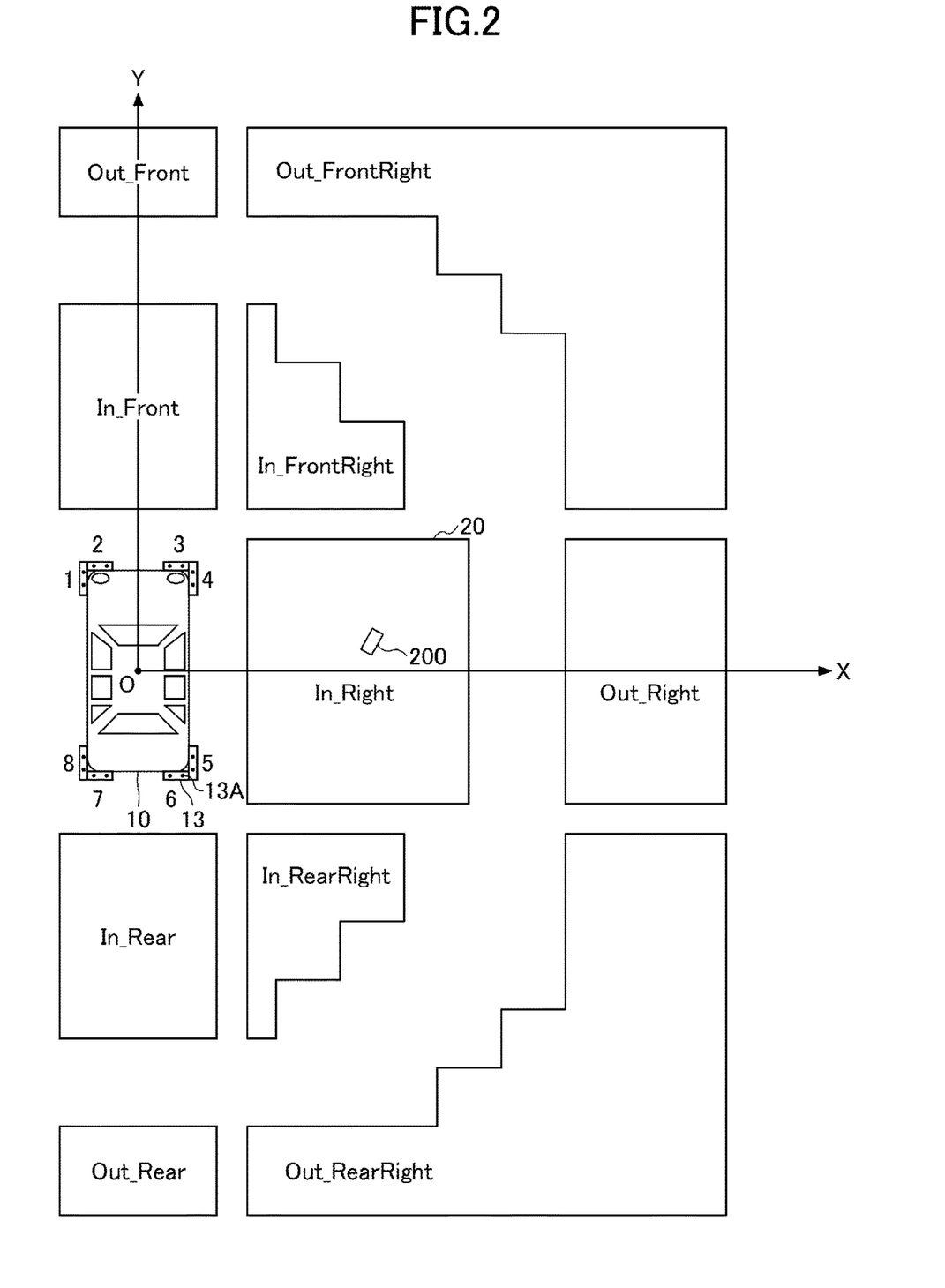
FIG. 2 is a plan view depicting the vehicle 10.

FIG. 2 is a plan view depicting the vehicle 10 and subzones. FIG. 2 depicts an XY coordinate system in which a center of the vehicle 10 of the plan view corresponds to an origin O. A position of the smartphone 200 is determined as values with respect to such an XY coordinate system.

Four corners of a body of the vehicle 10 are provided with a plurality of measuring units 13. In FIG. 2, eight measuring units 13 are depicted as an example. Left and right ends on a front edge of the vehicle 10 are provided with respective measuring units 13; left and right ends on a rear edge of the vehicle 10 are provided with respective measuring units 13; front and rear ends on a left edge of the vehicle 10 are provided with respective measuring units 13; and front and rear ends on a right edge of the vehicle 10 are provided with respective measuring units 13.

Numbers 1-8 are given to the eight measuring units 13. The measuring units 13 having the numbers 1, 4, 5, and 8 are provided at side portions of the vehicle 10, the measuring units 13 having the numbers 2 and 3 are provided at a front portion of the vehicle, and the measuring units 13 having the numbers 6 and 7 are provided at a rear portion of the vehicle.

Each measuring unit 13 has two antennas 13A. The two antennas 13A of each of the measuring units 13 having the numbers 1, 4, 5, and 8 are provided apart from each other in a front and rear direction (a longitudinal direction) of the vehicle 10, and two antennas 13A of each of the measuring units 13 having the numbers 2, 3, 6, and 7 are provided apart from each other in a lateral direction (a width direction) of the vehicle 10.

One of two measuring units 13 next to each other is an example of a first measurer, and the other is an example of a second measurer. The two antennas 13A included in the one of the two measuring units 13 next to each other are examples of first antennas, and the two antennas 13A included in the other are examples of second antennas.

A phase difference of a beacon signal measured by the two antennas 13A of the one of two measuring units 13 next to each other is an example of a first variable in accordance with a time of arrival of a radio wave, and a phase difference of a beacon signal measured by the two antennas 13A of the other measuring units 13 is an example of a second variable in accordance with a time of arrival of a radio wave. An angle measured from the phase difference measured by the one of the two measuring units 13 next to each other is an example of a first angle of arrival, and an angle measured from the phase difference measured by the two antennas 13A of the other measuring unit 13 is an example of a second angle of arrival.

RSSIs of a beacon signal measured by the one of two measuring units 13 next to each other are examples of a first reception strength, and RSSIs of a beacon signal measured by the other measuring unit 13 are examples of a second reception strength.

A plurality of subzones 20 are defined around the vehicle 10. The plurality of subzones 20 are examples of a plurality of zones. In FIG. 2, 10 subzones 20 are depicted at the front, the rear, and the right of the vehicle, whereas left subzones are omitted. The left subzones and the right subzones 20 are linearly symmetrical with respect to a Y-axis. The subzones 20 depicted in FIG. 2 are: In_Front, In_FrontRight, In_Right, In_RearRight, In_Rear, Out_Front, Out_FrontRight, Out_Right, Out_RearRight, and Out_Rear; XY coordinates of each of the subzones 20 are set. The subzones 20 include zones at the front and the rear, the left and the right, diagonally front left and front right positions, and diagonally rear right and rear left positions of the vehicle 10.

When it is determined by the position measuring ECU 100 that the smartphone 200 is inside the subzones 20 In_Front, In_FrontRight, In_Right, In_RearRight, and In_Rear, it is possible to operate the vehicle 10 from the smartphone 200.

When it is determined by the position measuring ECU 100 that the smartphone 200 is inside the subzones 20 Out_Front, Out_FrontRight, Out_Right, Out_RearRight, and Out_Rear, it is not possible to operate the vehicle 10 from the smartphone 200.

An area between the respective subzones In_Front, In_FrontRight, In_Right, In_RearRight, and In_Rear, and the subzones Out_Front, Out_FrontRight, Out_Right, Out_RearRight, and Out_Rear is an area within a range of 4 m to 6 m from the nearest measuring unit 13, and even if the smartphone 200 is in this area, it is determined as being inside any of the subzones 20.

Figure 3:
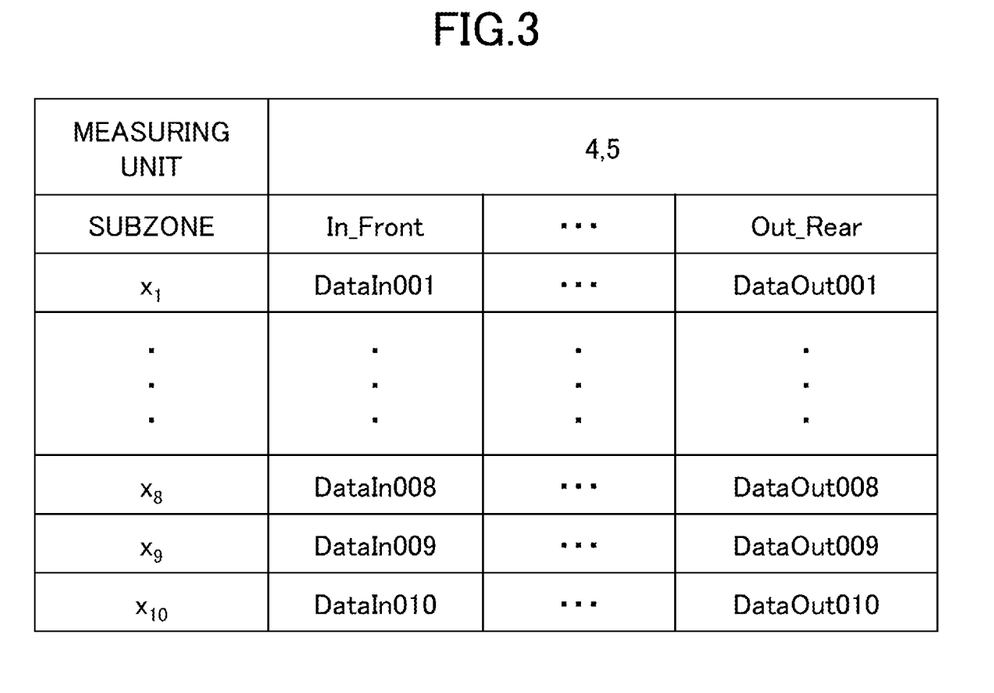
FIG. 3 is a diagram depicting data used to calculate Mahalanobis distances.

Next, a method for calculating a Mahalanobis distance will be described. FIG. 3 is a diagram depicting data used to calculate a Mahalanobis distance. The table data depicted in FIG. 3 is created for each set of two measuring units 13 next to each other. FIG. 3 depicts the table data for a set of measuring units 13 having the numbers 4 and 5. Similar table data is also provided for a set of measuring units 13 having the numbers 1 and 2, a set of measuring units 13 having the numbers 2 and 3, a set of measuring units 13 having the numbers 3 and 4, a set of measuring units 13 having the numbers 5 and 6, a set of measuring units 13 having the numbers 6 and 7, a set of measuring units 13 having the numbers 7 and 8, and a set of measuring units 13 having the numbers 8 and 1.

The table data includes the numbers of two measuring units 13 next to each other, subzones, and arithmetic means $\bar{x_i}$-bar and $\bar{x_j}$-bar of feature quantities $x_i$ and $x_j$. Because i and j are integers from 1 to 10, $x_1$-bar to $x_{10}$-bar are depicted in FIG. 3 as the arithmetic means $x_i$-bar and $x_j$-bar.

The subzones represent types of all subzones 20 (see FIG. 2) around the vehicle 10, including the subzones In_Front to In_Rear and the subzones Out_Front to Out_Rear depicted in FIG. 2, as well as the left subzones of the vehicle 10 which are omitted in FIG. 2.

The feature quantities $x_i$ and $x_j$ for $1 \le i \le 8$ and $1 \le j \le 8$ are RSSIs measured by the measuring units 13 having the numbers 1 to 8. An arithmetic mean of RSSIs obtained when a beacon signal are received by two antennas 13A of a measuring unit 13 is used as a RSSI of the measuring unit 13. The feature quantities $x_i$ and $x_j$ for $9 \le i \le 10$ and $9 \le j \le 10$ are angle data measured in an AOA method by two measuring units 13 next to each other. In the case of table data depicted in FIG. 3 for the measuring units 13 having the numbers 4 and 5, the angle data measured by the measuring units 13 having the numbers 4 and 5 is depicted.

It is noted that, from among the arithmetic means $x_i$-bar and $x_j$-bar of the feature quantities $x_i$ and $x_j$, the arithmetic means $x_i$-bar and $x_j$-bar of the feature quantities $x_i$ and $x_j$ for $1 \le i \le 8$ and $1 \le j \le 8$ representing the RSSI arithmetic means are examples of a first reference reception strength and a second reference reception strength.

From among the arithmetic means $x_i$-bar and $x_j$-bar of the feature quantities $x_i$ and $x_j$, the arithmetic means $x_i$-bar and $x_j$-bar of the feature quantities $x_i$ and $x_j$ for $9 \le i \le 10$ and $9 \le j \le 10$ representing the angle arithmetic means are examples of a first reference variable, a second reference variable, a first reference angle of arrival, and a second reference angle of arrival.

The arithmetic means $x_i$-bar and $x_j$-bar of the feature quantities $x_i$ and $x_j$ are arithmetic means taken for a predetermined number (Nm) of measurements of the feature quantities $x_i$ and $x_j$, respectively. That is, for the feature quantity xi, the arithmetic mean is calculated according to the following equation (1). The same applies to the feature quantity $x_j$.

$$\overline{x_i} = \frac{1}{Nm} \sum x_i \qquad (1)$$

The arithmetic means $x_i$-bar and $x_j$-bar of the feature quantities $x_i$ and $x_j$ for each of the subzones 20 are arithmetic means of RSSIs and arithmetic means of angle data taken for the predetermined number (Nm) of measurements when it is determined that the smartphone 200 is in the corresponding subzone 20. Such arithmetic means $x_i$-bar and $x_j$-bar of feature quantities $x_i$ and $x_j$ may be obtained in advance through an experiment, for example, and stored as table data.

With the use of the feature quantities $x_i$ and $x_j$ and the arithmetic means $x_i$-bar and $x_j$-bar, covariances $S_{ij}$ of the feature quantities $x_i$ and $x_j$ can be obtained through the following equation (2). Nd in the equation (2) denotes the number of the measuring units 13 (in the embodiment, Nd=8).

$$S_{ij} = \frac{1}{Nd} \sum (x_i - \overline{x_i})(x_j - \overline{x_j}) \qquad (2)$$

With the use of the feature quantities $x_i$ and $x_j$, the arithmetic means $x_i$-bar and $x_j$-bar, and the covariances $S_{ij}$, Mahalanobis distances MD can be obtained using the following equation (3). The equation (3) is an equation for obtaining $MD^2$, which is the square of a Mahalanobis distance MD. A square root of $MD^2$ obtained from the equation (3) is a Mahalanobis distance MD. The Mahalanobis distance MD is an example of a parameter representing how far a position (of the smartphone 200) from where radio waves are transmitted is away from the subzone 20.

$$MD^2 = [x_1 - \overline{x_1} \quad x_2 - \overline{x_2} \quad x_3 - \overline{x_3} \quad \ldots \quad x_{10} - \overline{x_{10}}] \begin{bmatrix} S_{11}S_{12}S_{13}\ldots \\ S_{12}S_{22}S_{23}\ldots \\ S_{13}S_{23}S_{33}\ldots \\ \vdots \\ & & & & S_{10\,10} \end{bmatrix}^{-1} \begin{bmatrix} x_1 - \overline{x_1} \\ x_2 - \overline{x_2} \\ x_3 - \overline{x_3} \\ \vdots \\ x_{10} - \overline{x_{10}} \end{bmatrix} \quad (3)$$

The Mahalanobis distance MD is obtained using the RSSIs and the angle data measured by two measuring units 13 next to each other having received the beacon signal from the smartphone 200. When the RSSIs and the angles are measured by the measuring units 13 having the number 4 and 5, the position measuring unit 120 calculates the covariance $S_{ij}$ through the equation (2) using the table data depicted in FIG. 3, and obtains $MD^2$, which is the square of the Mahalanobis distance MD, through the equation (3). The position measuring unit 120 can obtain the Mahalanobis distance MD by calculating the square root of the $MD^2$.

The Mahalanobis distances MD thus obtained are the Mahalanobis distances MD with respect to the measuring units 13 having the numbers 4 and 5 with respect to all subzones 20.

The position measuring unit 120 identifies the subzone 20 having the smallest Mahalanobis distance MD from among the Mahalanobis distances MD obtained for all subzones as the subzone 20 where the smartphone 200 is.

Figure 4:
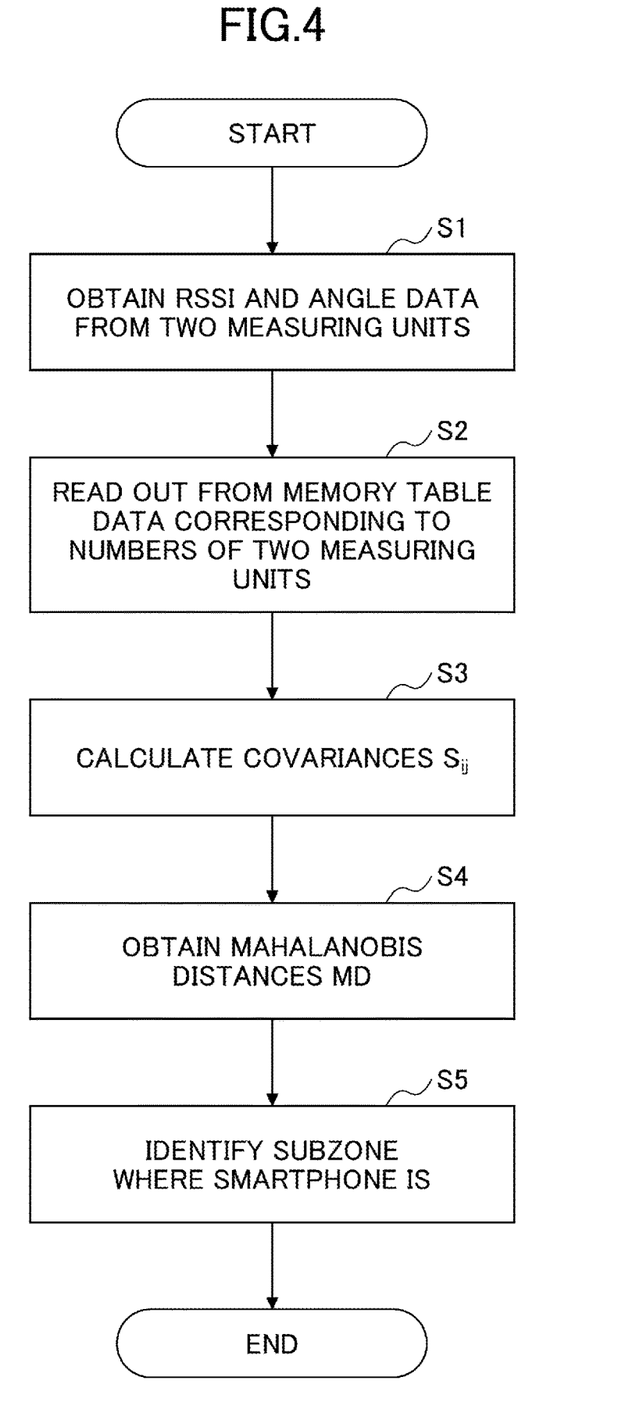
FIG. 4 is a flowchart depicting a process performed by a position measuring unit 120.

FIG. 4 is a flowchart depicting a process performed by the position measuring unit 120.

When processing starts (START), the position measuring unit 120 obtains RSSIs and angle data from the two measuring units 13 (step S1).

In step S2, the position measuring unit 120 reads out from the memory 140 the table data corresponding to the numbers of the two measuring units 13 that have thus obtained the RSSIs and the angle data.

In step S3, the position measuring unit 120 extracts the arithmetic means $x_i$-bar and $x_j$-bar of feature quantities $x_i$ and $x_j$ from the table data, and calculates covariances $S_{ij}$ according to the equation (2) using the RSSIs and the angle data.

In step S4, the position measuring unit 120 obtains $MD^2$, which are the square of the Mahalanobis distances MD, for all the subzones 20 according to the equation (3), and obtains square roots (Mahalanobis distances MD) thereof.

In Step S5, the position measuring unit 120 identifies a subzone 20, which has the smallest Mahalanobis distance MD from among all of the thus obtained Mahalanobis distances MD, as a subzone 20 where the smartphone 200 is.

Thus, the sequence of processing ends (END).

Figure 5:
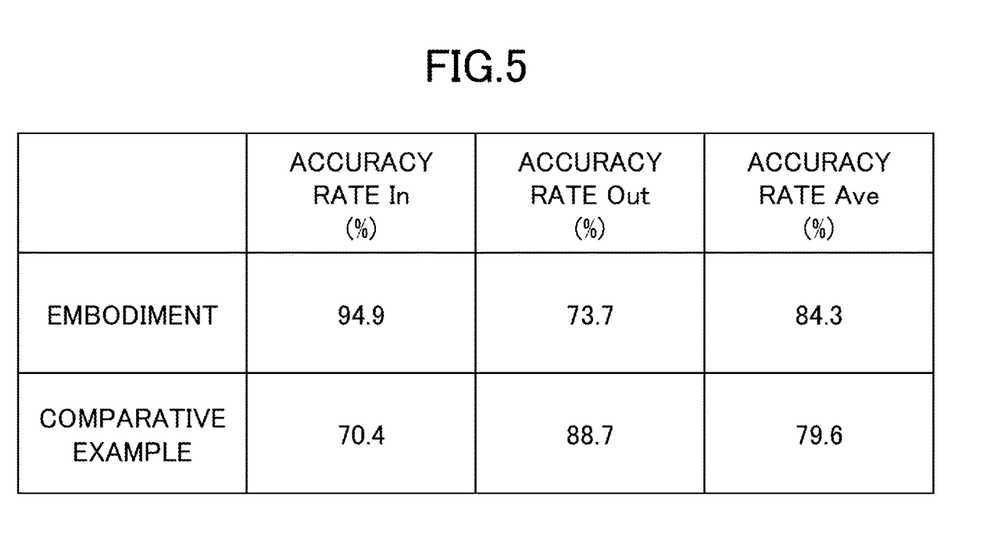
FIG. 5 depicts a determination result of a location system 100A.

FIG. 5 is a diagram depicting determination results of the location system 100A. FIG. 5 depicts an accuracy rate In when the smartphone 200 is in the In subzones 20, an accuracy rate Out when the smartphone 200 is in the Out subzones 20, and an accuracy rate Ave that is an arithmetic mean of the accuracy rate In and the accuracy rate Out. For comparison, an accuracy rate In, an accuracy rate Out, and an accuracy rate Ave for a position of the smartphone 200 measured from two angles measured by the two measuring units 13 in the AOA method using "relationships between two angles and a side therebetween" are depicted.

As can be seen from FIG. 5, it is found that the determination result of the location system 100A is improved by approximately 5% with respect to the accuracy rate Ave compared to the comparative example.

As described above, according to the embodiment, Mahalanobis distances MD are obtained by using RSSIs measured by the measuring units 13 and angles measured by the measuring units 13 in the AOA method. Thus, according to the embodiment, Mahalanobis distances MD are calculated using angles measured in the AOA method by the measuring units 13 in addition to RSSIs. RSSIs may be affected by how a smartphone 200 is held by hand or the like, but angles measured in the AOA method are hardly affected by how a smartphone 200 is held by hand or the like so that a subzone 20 where a smartphone 200 is can be identified with high accuracy.

Thus, it is possible to provide the location system 100A in which locating accuracy can be improved.

A mode of obtaining Mahalanobis distances MD using two angles measured by two measuring units 13 in the AOA method has been described. However, instead of two angles, reception times at which two measuring units 13 receive a beacon signal (i.e., times of arrival at which the beacon signal arrives at the two measuring units 13) may be used. In this case, as feature quantities $x_i$ and $x_j$ for $9 \leq i \leq 10$ and $9 \leq j \leq 10$, values in a time of arrival (TOA) type are used.

In this case, reception times at which two measuring units 13 receive a beacon signal are examples of the first variable and the second variable. As arithmetic means $x_i$-bar and $x_j$-bar of feature quantities $x_i$ and $x_j$ for $9 \leq i \leq 10$ and $9 \leq j \leq 10$, arithmetic means of reception times measured in advance through an experiment, for example, may be stored as table data. The arithmetic means $x_i$-bar and $x_j$-bar of feature quantities $x_i$ and $x_j$ for $9 \leq i \leq 10$ and $9 \leq j \leq 10$ are examples of a first reference time of arrival and a second reference time of arrival.

In addition, a mode of obtaining Mahalanobis distances MD using RSSIs measured by the measuring units 13 and angles measured in the AOA method by the measuring units 13 has been described. However, Mahalanobis distances MD may be obtained using, in addition to RSSIs and angles, quality factors with respect to phases measured by the two antennas 13A of the measuring unit 13, and quality factors with respect to variations in RSSIs measured by the measuring unit 13. The accuracy rate Ave was 87.2% using the quality factors.

In addition, a mode of obtaining Mahalanobis distances MD using RSSIs measured by the measuring units 13 and angles measured in the AOA method by the measuring units 13 has been described. However, a neural network or a decision tree may be used instead of Mahalanobis distances MD to obtain how far a position (of the smartphone 200) from where radio waves are transmitted is away from the subzone 20

In addition, a mode where the measuring units 13 include the ECUs, measure angle data, and transmit the data to the position measuring ECU 100 has been described. However, the measuring units 13 may only receive radio waves and the position measuring ECU 100 may measure angle data.

Although the location systems have been described with reference to the embodiments, the present invention is not limited to these embodiments, and various modifications or variations can be made within the scope of the present invention.

What is claimed is:

1. A location system comprising:
a first measurer configured to measure a first variable in accordance with a time of arrival of a radio wave and measure a first reception strength of the radio wave;
a second measurer apart from the first measurer and configured to measure a second variable in accordance with a time of arrival of a radio wave and a second reception strength of the radio wave;
a memory configured to store first data that associates a plurality of zones with a first reference variable and a second reference variable corresponding to times of arrivals of radio waves with respect to the first measurer and the second measurer for a case where the radio waves are transmitted from the plurality of zones, and second data that associates the plurality of zones with a first reference reception strength and a second reference reception strength with respect to the first measurer and the second measurer for the case where the radio waves are transmitted from the plurality of zones; and
a processor configured to identify from among the plurality of zones a zone that has a highest probability of including a position from where radio waves are transmitted, based on the first variable and second variable, the first reference variable and second reference variable, the first reception strength and second reception strength, and the first reference reception strength and second reference reception strength, using a predetermined identifying method.

2. The location system as claimed in claim 1, wherein
the first measurer and the second measurer include a plurality of first antennas and a plurality of second antennas, respectively, and are configured to measure a first phase difference with respect to radio waves received by the plurality of first antennas as the first variable and a second phase difference with respect to the radio waves received by the plurality of second antennas as the second variable, and obtain from the first phase difference and the second phase difference a first angle of arrival and a second angle of arrival of the radio waves,
the first data associates the plurality of zones with a first reference angle of arrival and a second reference angle of arrival of the radio waves with respect to the first measurer and the second measurer for the case where the radio waves are transmitted from the plurality of zones, and
the processor is configured to identify the zone that has the highest probability of including the position from where the radio waves are transmitted, based on the first angle of arrival and second angle of arrival, the first reference angle of arrival and second reference angle of arrival, the first reception strength and second reception strength, and the first reference reception strength and second reference reception strength.

3. The location system as claimed in claim 2, wherein
the location system calculates a parameter representing how far the position from where of the radio waves are transmitted is away from each of the plurality of zones for each of the plurality of zones, and
the location system identifies a zone having a smallest parameter as the zone including the position from where the radio waves are transmitted.

4. The location system as claimed in claim 3, wherein
the parameters are Mahalanobis distances.

5. The location system as claimed in claim 1, wherein
the first measurer and the second measurer measure the first time of arrival and the second time of arrival of the radio waves as the first variable and the second variable, respectively,
the first data associates the plurality of zones with a first reference time of arrival and a second reference time of arrival of radio waves with respect to the first measurer and the second measurer for the case where the radio waves are transmitted from the plurality of zones, and
the processor identifies the zone that has the highest probability of including the position from where the radio waves are transmitted, based on the first time of arrival and second time of arrival, the first reference time of arrival and second reference time of arrival, the first reception strength and second reception strength, and the first reference reception strength and second reference reception strength.

6. The location system as claimed in claim 5, wherein
the location system calculates a parameter representing how far the position from where of the radio waves are transmitted is away from each of the plurality of zones for each of the plurality of zones, and
the location system identifies a zone having the smallest parameter as the zone including the position from where the radio waves are transmitted.

7. The location system as claimed in claim 6, wherein
the parameters are Mahalanobis distances.

8. The location system as claimed in claim 1, wherein
the location system calculates a parameter representing how far the position from where of the radio waves are transmitted is away from each of the plurality of zones for each of the plurality of zones, and
the location system identifies a zone having a smallest parameter as the zone including the position from where the radio waves are transmitted.

9. The location system as claimed in claim 8, wherein
the parameters are Mahalanobis distances.

* * * * *